United States Patent [19]

Hall

[11] 3,947,054

[45] Mar. 30, 1976

[54] FOLDING LUGGAGE CARRIER

[76] Inventor: Herbert Charles Hall, 4175 Oak Hollow Road, Claremont, Calif. 91711

[22] Filed: Nov. 4, 1974

[21] Appl. No.: 520,366

[52] U.S. Cl............ 280/36 C; 280/41 C; 280/47.29
[51] Int. Cl.².......................................... B62B 3/00
[58] Field of Search... 280/36 C, 41 C, 37, 47.13 R, 280/47.37, 47.29, 47.27, 47.17; 190/18 A

[56] References Cited
UNITED STATES PATENTS

| | | | |
|---|---|---|---|
| 2,602,675 | 7/1952 | Forman............................. | 280/36 C |
| 2,727,753 | 12/1955 | Johnson et al............... | 280/47.37 R |
| 2,765,178 | 10/1956 | Wallace............................. | 280/37 |
| 3,142,087 | 7/1964 | Yokers......................... | 280/47.17 X |
| 3,203,707 | 8/1965 | Anderson..................... | 280/47.37 R |

Primary Examiner—M. H. Wood, Jr.
Assistant Examiner—Michael J. Forman
Attorney, Agent, or Firm—Boniard I. Brown

[57] ABSTRACT

A folding luggage carrier is provided with a tubular, substantially rectangular, primary frame with a pair of wheels attached to two adjacent corners. A secondary frame, similar in construction but smaller than the primary frame, is hinged to the primary frame with a pair of pivot pins and may be extended into a position coplanar therewith. The secondary frame is arcuately bulged at its points of superposition with the primary frame when in the extended position. A platform or load stop near the wheels supports luggage stacked onto the carrier and a flexible strap is used to tie the luggage to the framework by means of a buckle attached to the upper crossmember of the secondary frame.

In an alternate embodiment a tertiary frame may be nestled in the secondary frame and receive the buckle.

5 Claims, 9 Drawing Figures

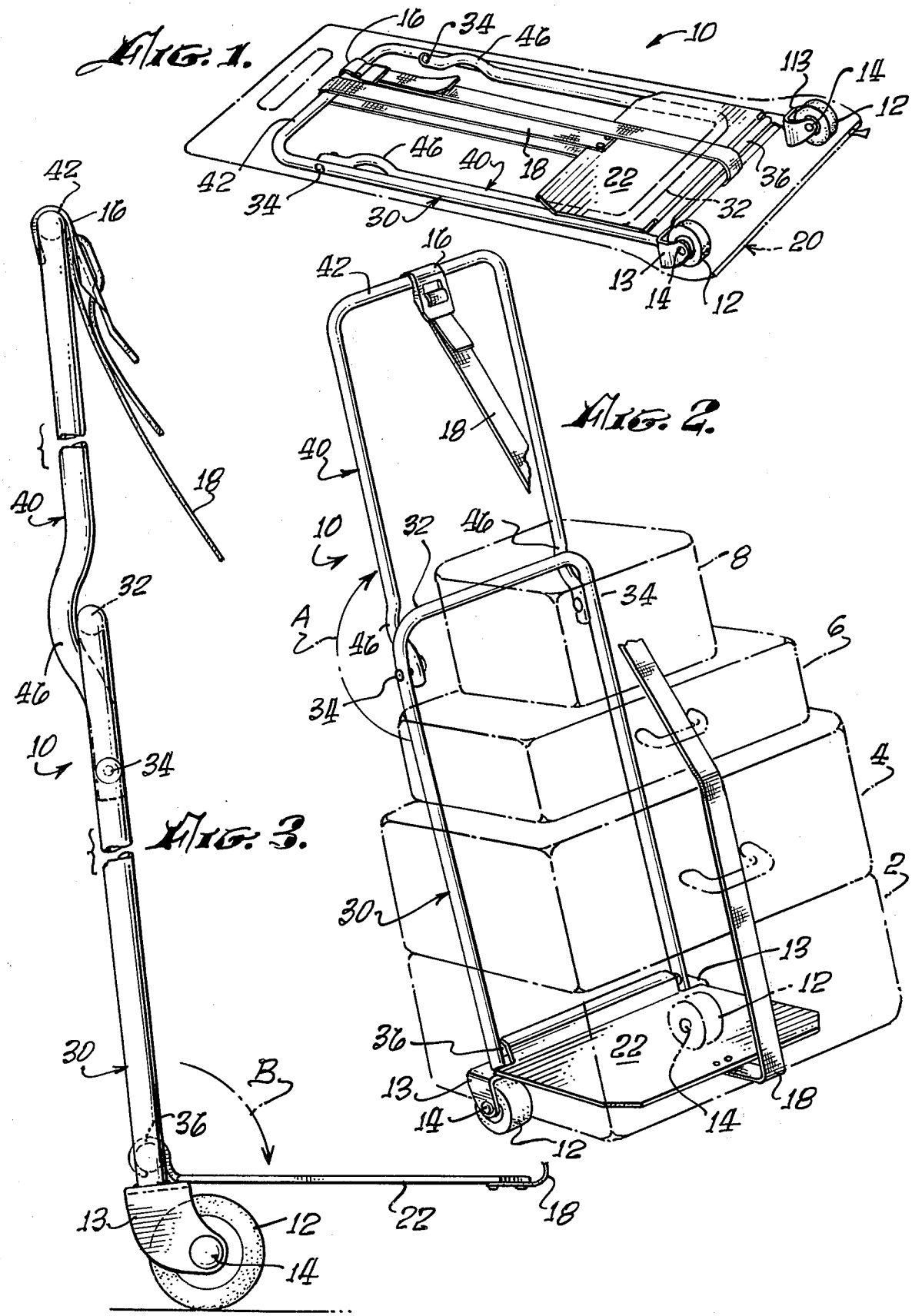

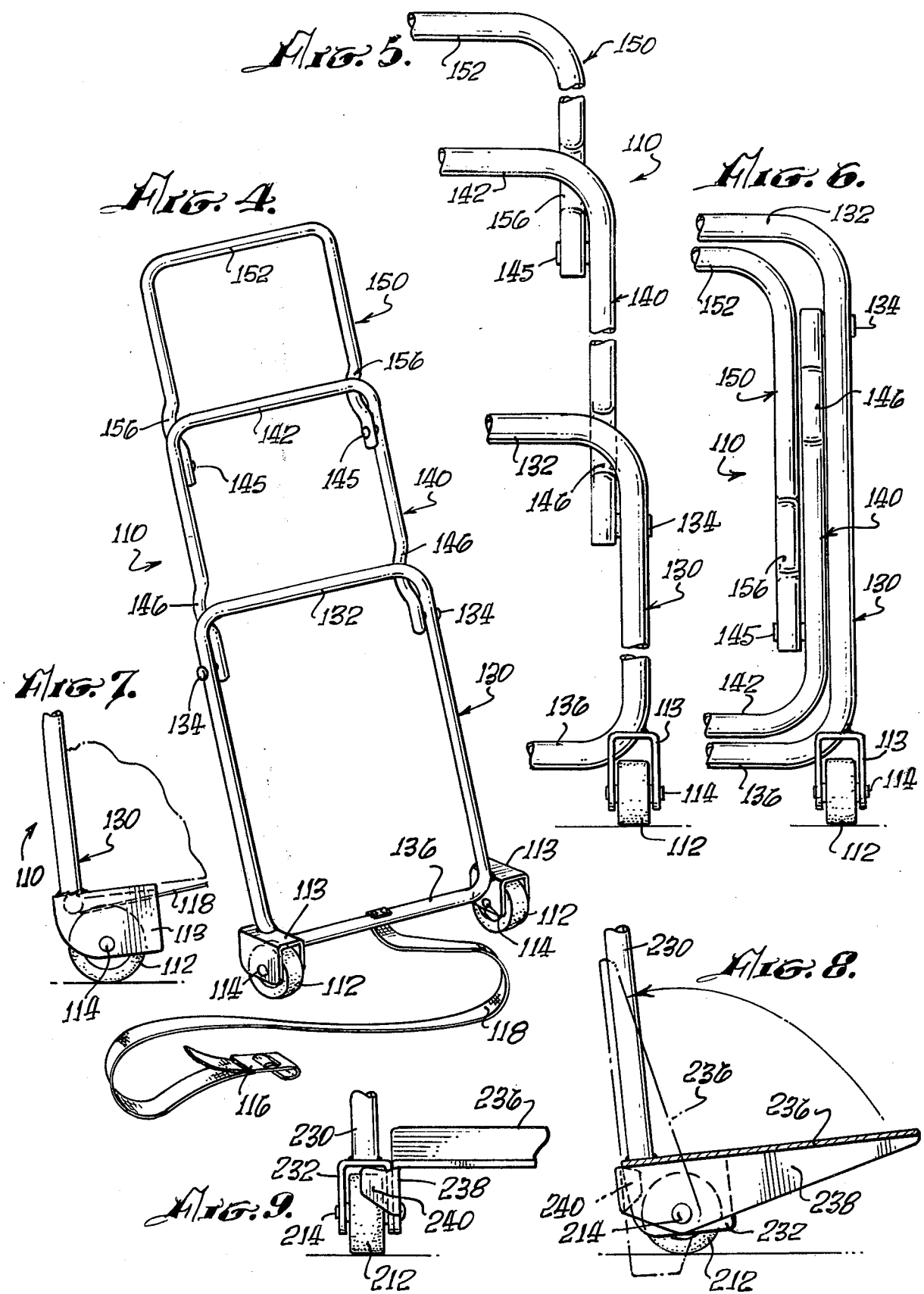

FOLDING LUGGAGE CARRIER

BACKGROUND OF THE INVENTION

1. Field of the Invention

This invention relates to wheeled luggage carriers. It relates, more particularly, to such carriers having a foldable structure adapted to be handcarried in a stowed condition.

2. Prior Art

The problem of providing a traveller with means to convey his luggage with ease during transfer from one place to another is of long standing and many devices of the prior art provide for solutions of one type or another.

Such devices of the prior art generally provide for wheels, casters, or rollers attached by means of a framework to a piece of luggage, or for a more elaborate, self supporting, frame adapted to receive several pieces of luggage.

In general, such devices tend to be bulky, difficult to stow and carry when not in active use, and relatively heavy compared to their load-bearing capacity.

It is, therefore, a primary object of the invention to provide a luggage carrier construction for trunks and suitcases which is light in weight, easy to fold, simple to use and economical in construction.

It is a further object of the invention to provide in such a foldable luggage carrier external dimensions compatible with stowage within a piece of luggage.

It is yet another object of the invention to provide a foldable frame for a luggage carrier held in the extended condition by the load placed thereon and wherein the frame and the load are interlocked by means of a flexible strap.

SUMMARY OF THE INVENTION

To attain its objects, the invention provides a foldable luggage carrier with a rectangular primary frame constructed from rigid tubing and mounting a pair of wheels at two adjacent corners.

A secondary frame is nestled inside the primary frame and is pivotally attached thereto with a pair of coaxial pivot pins. The secondary frame may be extended from the primary frame to form a coplanar structure therewith. Arcuate bulges in the perimeter of the secondary frame allow for the superposition of the two members in the extended condition.

A stop, extending — or extendable — in a substantially orthogonal direction from the primary frame near the location of the aforementioned wheels provides for an abutment to the load placed on the carrier.

A flexible strap, or cinch, is attached to, or near, the stop; the strap is drawn around the luggage and secured to the uppermost crossmember of the framework by means of a buckle.

A more compact folded structure, or a longer loading bed, may be secured by adding a tertiary frame to the assembly. The tertiary frame nestles inside the secondary, and is pivoted thereon, in the same manner as the secondary frame is nestled and pivoted into the primary.

The luggage carrier of the invention may be constructed from steel or aluminum tubing; it is simple to use and light in weight. Examples have been constructed weighing three pounds and capable of supporting one hundred and fifty pounds.

These advantages, and others, will become apparent from the description of the preferred embodiment, below.

BRIEF DESCRIPTION OF THE DRAWINGS

The preferred embodiment of the invention is illustrated and described with reference to the accompanying drawings, in which:

FIG. 1 is a perspective view of a foldable luggage carrier of the invention in the folded condition, stowed in a carrying bag;

FIG. 2 is a perspective view of the preferred embodiment of the invention with a representative load strapped to its frame;

FIG. 3 is a side elevation of the embodiment of FIG. 1 in the fully extended position;

FIG. 4 is a perspective view of another embodiment of the invention — employing two extendable subframes — in the fully extended condition;

FIG. 5 is a partial, frontal elevation of the embodiment of FIG. 4, in the extended condition;

FIG. 6 is a partial, frontal elevation of the embodiment of FIG. 4, in the folded condition;

FIG. 7 is a partial side elevation of the embodiment of FIG. 4, illustrating the employment of the wheel covers as load supports, and FIGS. 8 and 9 show a further embodiment of the invention, FIG. 8 being a fragmentary side elevational view, and FIG. 9 being a fragmentary frontal elevational view.

DESCRIPTION OF THE PREFERRED EMBODIMENT

In FIG. 1, a luggage carrier 10 of the invention is shown in folded condition, enveloped by a zippered carrier bag 20. The carrier 10 is equipped with a primary frame 30, a secondary frame 40, a luggage supporting platform 22 and a pair of wheels 12.

The same embodiment of the invention is also illustrated in the side view of FIG. 3 and the perspective view of FIG. 2; reference is made to all three Figures.

The primary frame 30 is a U-shaped structure stiffened near the open legs of the U by a cross-brace 36 which also serves as a pivot axis for the platform 22. The secondary frame 40 is of similar construction to the primary frame, being also U-shaped and formed of the same tubular material — steel or aluminum tubing by preference — as the primary frame. The secondary frame 40 is somewhat smaller than the primary frame so that in the stowed condition, illustrated in FIG. 1, it may be folded into the plane of the latter component.

The primary and secondary frames are assembled to each other by pivot pins 34 forming a hinge. An arcuate segment 46 in each leg of the secondary frame provides the required clearance for base 32 of the primary frame in the open condition of the luggage carrier, and acts as a load transmitting stop in the opening direction (indicated by the arrow A) of the carrier.

The wheels 12 rotate freely on shafts 14 held in wheel frames 13 welded to the free ends of the primary frame 30, just below the cross-brace 36. The upper face of the frames 13 limit the downward travel of the platform 22 in its opening direction — in the sense of arrow "B" of FIG. 3 — and transmit the load placed on the platform into the primary frame 30.

A flexible strap 18 is attached at one end to the outer edge of the platform 22, the edge farthest from its pivot axis at cross-brace 36, and is looped through a buckle 16 which, in turn, is hooked over base 42 of the secondary frame.

During loading, the luggage carrier 10 is laid on the floor and the secondary frame 40 and the platform 22 pivoted out of the primary frame 30 into the using position, as shown in FIG. 3. The luggage, typically items 2, 4, 6 and 8, is then loaded against the opened platform 22; to secure the luggage onto the carrier the strap 18, with its buckle 16, is passed around the load, or through the projecting handles for greater safety, and hooked over member 42.

Tightening of the strap 18 assures the unity of the carrier 10 and the luggage loaded thereon into a single, rigid entity, and permits the ready transport of the whole by pushing or pulling on base 42 of the secondary frame, acting as a handle.

When not in use, the secondary frame and the platform are folded within the primary frame and is secured into a flat package by passing the strap 18 over base 32 and cross-brace 36, successively, and pulling it tight through the buckle 16, as shown in FIG. 1. The collapsed carrier is small enough to fit into a piece of the transported luggage, such as 2, or may be carried separately in carrier bag 20.

A modified embodiment 110 of the luggage carrier of the invention is shown in FIGS. 4, 5, 6 and 7 of the drawings. FIG. 4 is a perspective view of the carrier 110 in the fully open condition, ready to receive the luggage to be carried. FIG. 5 is a partial frontal view of the structure of FIG. 4; while FIG. 6 is a view similar to FIG. 5, but showing the carrier in the folded condition. FIG. 7 is a partial side elevation of the carrier 110, showing a wheel frame 113 acting as a support for luggage 2.

The structure of the luggage carrier 110 is based on a primary frame 130, rectangular in shape and secondary and tertiary frames 140 and 150, respectively. The frames 140 and 150 are U-shaped and open at their downward edges, when in the open position of FIG. 4.

The secondary frame 140 is smaller than the primary frame 130, so that in the collapsed position of FIG. 6 it folds within the latter part. The tertiary frame 150 bears a relationship to the secondary frame 140 analogous to the latter's fit within the primary frame. The interfolded structure of the three frames is clearly shown in FIG. 6.

Pivot pins 134 form a hinge between the primary and secondary frames; pivot pins 145 interconnect the secondary and tertiary frames. Arcuate segments 146 in the legs of the secondary frame 140 bear against section 132 of the primary frame in the open position and similar segments 156 in the legs of tertiary frame 150 bear against the base 142 of the secondary frame.

Wheels 112 are freely rotatable on shafts 114 rigidly fixed into wheel frames 113. The frames 113 are welded to the lower corners of the primary frame and are braced against spreading loads by section 136 of the frame 130.

Strap 118 is fixed at one end to section 136; the other end, normally free, is looped through a buckle 116 which is hooked to base 152 of the tertiary frame.

The embodiment of FIG. 4 is lighter and more compact than the corresponding embodiment of FIG. 2; its use follows the same sequence of operations of unfolding the interleaved frame members, stacking the luggage against the upper surfaces of wheel frames 113, with the extended frame in a substantially horizontal alignment, and securing the luggage with flexible strap 118 and buckle 116.

FIGS. 8 and 9 show another modified embodiment of the luggage carrier of the invention, wherein a modified platform 236 is pivotally mounted on wheel shafts 214. Rib members extend downwardly from the platform and have integral stop tabs 240 at their inner ends. With the platform in its open position, shown in FIG. 8, the stop tab extends under wheel frame 213 to maintain the platform 236 in this open position. The platform is maintained in its closed or retracted position, shown in phantom outline, by engagement of the stop tabs 240 with the lower edge portions of wheel frames 213, as indicated in phantom outline.

The inventor claims:

1. A foldable carrier for hand luggage, comprising:

a substantially rectangular primary frame having normally upper and lower ends and normally front and rear sides and including two parallel side members, and a normally lower cross-brace and a normally upper base extending between and joining said side members;

a pair of wheels rotatably mounted on the lower end of said frame;

luggage support means extending forwardly from the lower end of said primary frame;

a secondary frame including two parallel side members and a base extending between and joining said latter side members at one end thereof;

said second frame side members including free end portions having extremities disposed between said primary frame side members adjacent said primary frame base, opposite end portions aligned with said free end portions, respectively, and arcuate segments between and joining said free end portions and opposite end portions, and means pivotally joining said second frame extremities to said primary side frame members on a pivot axis parallel to said frame bases and cross-brace for rotation of said second frame between a storage position wherein said second frame portions are coplanar with and disposed within said primary frame and a use portion wherein said second frame portions are coplanar with said primary frame, said second frame segments curve about and seat against the rear side of said primary frame base, and said opposite end portions of said second frame side members rise above said primary frame base to form a luggage supporting extension of and coplanar with said primary frame.

2. The carrier of claim 1, including a strap for extending across the front side of said carrier between the lower end of said primary frame and the upper end of said second frame when said second frame occupies its use position relative to said primary frame, means securing one strap end to one of said latter frame ends and means for releasably securing the other strap end to the other latter frame end.

3. The carrier of claim 1, wherein said luggage support means is pivotally attached to said primary frame cross-brace to fold into generally coplanar relation with said primary frame, and said strap is attached to said luggage support means.

4. The carrier of claim 1, comprising a third frame including two parallel side members and a base extending between and joining said latter side members at one end thereof, said third frame side members including free end portions having extremities disposed between said second frame side members adjacent said second frame base, opposite end portions aligned with said latter free end portions, respectively, and arcuate segments between and joining said latter free end portions and opposite end portions, and means pivotally joining said third frame extremities to said second side frame members on a pivot axis parallel to said frame bases and cross-brace for rotation of said third frame between a storage position wherein said third frame portions are coplanar with and disposed within said second frame and a use portion wherein said second frame portions are coplanar with said second frame, said third frame segments curve about and seat against the rear side of said second frame base, and said opposite end portions of said third frame side members rise above said second frame base to form a luggage supporting extension of and coplanar with said primary and second frames.

5. The carrier of claim 4, including a strap for extending across the front side of said carrier between the lower end of said primary frame and the upper end of said second frame when said second frame occupies its use position relative to said primary frame, means securing one strap end to one of said latter frame ends and means for releasably securing the other strap end to the other latter frame end.

* * * * *